(12) United States Patent
Bozeat et al.

(10) Patent No.: US 6,374,001 B1
(45) Date of Patent: Apr. 16, 2002

(54) HIGH CONDUCTIVITY BURIED LAYER IN OPTICAL WAVEGUIDE

(75) Inventors: Robert J Bozeat; Vishal Nayar, both of Malvern (GB)

(73) Assignee: The Secretary of State for Defence, Farnborough (GB)

( * ) Notice: Subject to any disclaimer, the term of this patent is extended or adjusted under 35 U.S.C. 154(b) by 0 days.

(21) Appl. No.: 09/380,982

(22) PCT Filed: Feb. 24, 1998

(86) PCT No.: PCT/GB98/00585

§ 371 Date: Sep. 14, 1999

§ 102(e) Date: Sep. 14, 1999

(87) PCT Pub. No.: WO98/43128

PCT Pub. Date: Oct. 1, 1998

(30) Foreign Application Priority Data

Mar. 20, 1997 (GB) .............................. 9705803

(51) Int. Cl.[7] .............................. G02F 1/295; G02B 6/10
(52) U.S. Cl. .............................. 385/8; 385/40; 385/131
(58) Field of Search .......................... 385/4, 8, 39, 40, 385/41, 129, 130, 131, 132

(56) References Cited

U.S. PATENT DOCUMENTS

| 4,787,691 A | * 11/1988 | Lorenzo et al. ......... 350/96.14 |
| 4,868,633 A | * 9/1989 | Plumton et al. ............. 357/67 |
| 5,153,934 A | 10/1992 | Okayama et al. |
| 5,434,935 A | 7/1995 | Kragl |

* cited by examiner

Primary Examiner—John D. Lee
Assistant Examiner—Jerry Rahll
(74) Attorney, Agent, or Firm—Nixon & Vanderhye P.C.

(57) ABSTRACT

An optical device (300) comprises a multilayer structure, formed by wafer bonding, incorporating in sequence a silicon dioxide layer (304), a buried silicide layer (306), a contact layer (308) and a silicon surface layer (310). The surface layer (310) is selectively etched to form an exposed rib (312). An upper surface of the rib (312) is doped to form an elongate electrode (314) therealong. The surface layer (310) is selectively etched to the contact layer (308) in regions remote from the rib (312) to form via channels (316a, 316b) for making electrical connection to the contact layer (308). The rib (312) forms a waveguide along which radiation propagates. When the electrode (314) is biased relative to the contact layer (308), charge carriers are injected into the rib (312) and induce refractive index changes in a central region (324) thereof where most of the radiation propagates along the rib (312). The silicide layer (306) provides an efficient current conduction path for injecting the carriers, thereby providing enhanced device operating bandwidth and reduced power dissipation.

31 Claims, 10 Drawing Sheets

HIGH CONDUCTIVITY BURIED LAYER IN OPTICAL WAVEGUIDE

BACKGROUND OF THE INVENTION

1. Field of the Invention

This invention relates to an optical device, and particularly but not exclusively to a device for modulating radiation guided in a waveguide.

2. Discussion of Prior Art

Optical devices are well known in the prior art. They are described in a publication "Introduction to Semiconductor Integrated Optics" by H P Zappe (ISBN 0-89006-789-9, Artech House Publishers 1995). Optical devices for modulating radiation operate by exploiting optical properties of a modulating medium which are modifiable by external influences. One of the optical properties may include a refractive index. Induced changes in the refractive index may be anisotropic, where the medium becomes birefringent, or isotropic. There are many possible techniques for modulating the refractive index. These techniques are herewith described.

Refractive index changes may be induced in some optically transmissive materials by the application of an external mechanical force to them. This is referred to as a photoelastic effect. Thermally induced refractive index changes are referred to as a thermo-optic effect.

Magnetically induced birefringence, referred to as a Faraday or magneto-optic effect, arises within some optically transmissive materials when subjected to a magnetic field. Factors such as magnetic flux density within the materials, a Verdet constant of the materials, composition of the materials and radiation propagation path length within the materials determine the magnitude of birefringence attainable.

Refractive index changes may be induced in some materials by application of an electric field to them. These refractive index changes occur due to both the Kerr and the Pockels effect. Refractive index changes arising from the Kerr effect are proportional to the Kerr constant of the materials and the square of the electric field applied to them. For the Pockels effect, refractive index changes are proportional to the applied electric field. The Pockels effect is only observed in crystalline materials comprising crystals which lack a centre of symmetry.

Refractive index changes may also be induced in some materials by introducing free charge carriers into them. Such changes are referred to as free carrier modulation or sometimes as a plasma dispersion effect. The free carriers modify both real and imaginary parts of the refractive index, thereby introducing both optical phase shift and optical absorption to optical radiation propagating through regions of these materials in which the carriers are present.

Silicon has a centro-symmetric crystalline structure and therefore does not exhibit the Pockels effect, except when high temperature poling is applied in which case a weak effect is obtained. This weak effect corresponds to a coefficient r of $10^{-12}$ m $V^{-1}$ in equation [1] which describes a change in refractive index $\Delta n$ as a function of silicon refractive index $n_o$ and applied electric field E:

$$\Delta n = \frac{1}{2} n_0^3 r E \qquad [1]$$

Silicon weakly exhibits the Kerr effect when very high strength electric fields are applied to it, for example refractive index changes of approximately $10^{-4}$ are attainable for applied electric field strengths of $10^6$ V $m^{-1}$. In order to provide a practicable optical device for modulating radiation based upon a silicon waveguide, either the thermo-optic effect or the plasma dispersion effect have to be exploited. Operating bandwidths of devices relying on the thermo-optic effect in a silicon waveguide are restricted by relatively slow thermal dynamics of the waveguide, bandwidths of tens of kilohertz may be attained in practice for power inputs amounting to several Watts. Conversely, operating bandwidths of devices relying on the plasma dispersion effect in silicon waveguide are restricted by rapidity of removal and injection of charge carriers from a region thereof in which optical radiation propagates; such devices may provide operating bandwidths of several tens of megahertz in practice.

Optical radiation propagating within a homogeneous medium has an electric field vector of a magnitude E which varies spatially in the medium at an instance of time according to equation [2]:

$$E\, e^{ikx} \qquad [2]$$

in which
  k is a wavenumber of the optical radiation;
  x is a distance in the medium; and
  i is a square root of $-1$.

The wave number k in equation [2] is expressible as a product of a free-space wavenumber $k_o$ for the optical radiation and the refractive index n of the medium according to equation [3]:

$$E\, e^{ink_o x} \qquad [3]$$

In equation [3], the refractive index n may be expressed in terms of a real part $n_r$ and an imaginary part $\alpha$ according to equation [4]:

$$n = n_r + i\alpha \qquad [4]$$

from which the magnitude of the electric field strength E is expressible according to equation [5]:

$$E\, e^{in_r k_o x} e^{-\alpha k_o x} \qquad [5]$$

When the medium is silicon, injection of free carriers thereinto modifies both the real part $n_r$ and imaginary part $\alpha$ of the refractive index n which are interrelated according to the Kramers-Kronig relationship which is expressed in equations [6] and [7]:

$$\Delta n_r = -\frac{q^3 \lambda^2}{4\pi^2 c^3 n_r \varepsilon_o}\left(\frac{N_e}{m_{ce}^2 \mu_e} + \frac{N_h}{m_{ch}^2 \mu_h}\right) \qquad [6]$$

$$\Delta \alpha = -\frac{q^2 \lambda^2}{8\pi^2 c^2 n_r^2 \varepsilon_o}\left(\frac{N_e}{m_{ce}} + \frac{N_h}{m_{ch}}\right) \qquad [7]$$

in which
  c is the speed of light in vacuum;
  $\mu_e$ is an electron mobility within silicon;
  $\mu_h$ is an hole mobility within silicon;
  $m_{ce}$ is an effective mass of a free electron within silicon;
  $m_{ch}$ is an effective mass of a free hole within silicon;
  q is the charge on an electron;
  $\lambda$ is a wavelength of radiation propagating in the medium;

$N_e$ is a free electron concentration within the medium;
$N_h$ is a free hole concentration within the medium;
$\Delta n_r$ is a change in the real part $n_r$;
$\Delta \alpha$ is a change in the imaginary part $\alpha$; and
$\epsilon_o$ is the permittivity of free space.

For optical radiation of 1 μm wavelength propagating in silicon, changes to the real part $n_r$ of approximately $10^{-4}$ may be induced by charge carrier injection. Accompanying changes to the imaginary part are an order of magnitude smaller than this.

Prior art optical devices for modulating radiation based on a silicon waveguide generally exploit the plasma dispersion effect. Such devices employ a silicon p-i-n diode structure fabricated using standard silicon microfabrication techniques, for example epitaxial techniques for growing layers onto a wafer substrate. The structure comprises an electron acceptor doped p region, an intrinsic i region in the form of a rib and an electron donor doped n region. Optical radiation is confined to the intrinsic i region which functions as a waveguide. Charge carriers are injected into the intrinsic i region from the p and n regions when the p region is biased at a higher potential than the n region. The carriers modulate the refractive index of the waveguide.

The injected charge carriers induce a small phase change in the radiation propagating in the prior art devices. This phase change is converted into an amplitude change by incorporating at least one device into a Mach-Zehnder interferometer.

A first example of a prior art optical device is described in a patent specification U.S. Pat. No. 4,787,691. The device is designed for modulating and switching guided light in a waveguide. It comprises in sequence a silicon substrate base, a n+ doped influx silicon substrate, a low refractive index dielectric layer, a n-type crystalline silicon layer and a p+ doped silicon layer. The low index dielectric layer is etched during device fabrication to form a dielectric strip in the device. The n-type layer and p+ doped layer are etched during device fabrication to form a waveguide with a p+ electrode on top of it, said waveguide and electrode aligned along the strip. The strip assists to confine radiation within the waveguide. The p+ electrode forms a first electrode of the device and the substrate base forms a second electrode thereof. A potential difference applied between the first and second electrodes results in carrier injection into the waveguide which modifies its refractive index and hence characteristics of radiation propagating therealong.

The device described above in the specification U.S. Pat. No. 4,787,691 is fabricated using a process which involves etching layers grown onto the substrate base. Its structure is therefore governed by limitations imposed by the process. One of these limitations is that the substrate base is used for one of the electrodes. This results in a first problem when several devices are formed together on the substrate base that the base will form a second electrode common to the devices. This places limitations on circuit configuration possible for controlling the device. Moreover, the base and the influx silicon substrate provide a conductivity which is several orders of magnitude less than that of a metal such as aluminium. This results in a second problem of electrode series resistance which degrades device operating efficiency because power is dissipated within the series resistance itself rather than in regions where charge injection occurs and a useful modulation effect is obtained. Furthermore, charge carriers in the device are injected predominantly into edge regions of the waveguide on account of the dielectric strip being positioned beneath the waveguide. However, radiation propagates predominantly in a central region of the waveguide hence charge carriers injected into edge regions of the waveguide are not particularly effective at modulating radiation in the waveguide. Therefore, an unnecessary excess of charge carriers are injected to achieve a desired modulation of radiation within the waveguide. This results in a third problem that the unnecessary excess of carriers reduces modulation bandwidth of the device because of time required for recombination of the excess of carriers within the waveguide.

A second example of a prior art optical device is described in a European patent specification EP 0 121 401 A2. The device comprises in sequence a substrate, a substrate layer, an optical waveguide layer and buffer layers formed of either all n-type or all p-type compound semiconductor crystal. The layers are all formed by epitaxial deposition onto a first side of the substrate. A rib waveguide is formed from the buffer layers by selectively etching them. One of the buffer layers provides a first electrode on top of the rib waveguide and a metal alloy layer deposited on a second side of the substrate provides a second electrode. Radiation propagating along the waveguide is modified in response to a potential difference applied to the first and second electrodes. The device described above in the European patent specification suffers, on account of limitations arising from its method of fabrication, from the first and second problems mentioned above affecting the device in the first example.

A third example of a prior art optical device is described in a patent specification U.S. Pat. No. 4,093,345. The device incorporates a monocrystalline substrate of n-type gallium arsenide supporting a first epitaxial layer of n-type aluminium gallium arsenide, a second epitaxial layer of n-type aluminium gallium arsenide having a lower aluminium-to-gallium ratio than that of the first epitaxial layer, a layer of electrode cladding material contacting a rib portion of the second epitaxial layer, a gold electrode contact layer ohmically contacting the electrode cladding layer and a tin electrode contact layer ohmically contacting the substrate. The device is arranged so that a modulating potential applied to the gold electrode layer and the tin contact layer changes refractive index of the rib portion for modulating radiation propagating therealong. The device is fabricated using an epitaxial process which imposes limitations on structure of the device. As a result of these limitations, the device suffers from the first and second problems mentioned above which affect the devices described in the first and second examples above.

It is an object of the invention to provide an alternative optical device which alleviates at least one of the problems mentioned above.

SUMMARY OF THE INVENTION

According to the present invention, an optical device is provided which has an active region for radiation propagation and injecting means for injecting charge carriers into the active region, characterised in that the injecting means incorporates a high conductivity buried layer between two wafer elements of a bonded wafer couplet and the device incorporates concentrating means between the buried layer and the active region for concentration of charge carriers in the active region.

The invention provides an advantage that the high conductivity layer provides an electrical path for biasing the device with reduced dissipation compared to prior art optical devices. Moreover, the invention provides an advantage that the device modulates radiation more effectively than prior art devices because the concentrating means concentrates charge carriers in the active region where radiation propagates.

The device may incorporate a dielectric insulating layer for electrically isolating it within the wafer couplet. This provides an advantage, for example when several devices are fabricated together on the couplet, that the device is isolated from the wafer elements.

The active region may incorporate dopant impurity to a concentration to a concentration of less than $10^{16}$ atoms cm$^{-3}$. This provides an advantage that the active region is capable of providing a propagation path for radiation where radiation attenuation is less than 1 dB cm$^{-1}$.

The active region may provide radiation waveguiding means with refractive index modulatable by the injecting means. This provides a convenient device configuration for modulating radiation propagating in the active region, especially when the active region comprises material having a centro-symmetrical crystal structure.

The concentrating means may comprise a first electrode located upon one side of the active region and the device includes a second electrode located upon the other side. This provides an advantage of being a simple practical configuration for the device.

In a first embodiment, the concentrating means may be a region of the buried layer which projects through an insulating layer extending between parts of the device. This provides a structure which is particularly effective at concentrating charge carriers in the active region, thereby increasing effectiveness of the device.

The buried layer may be a polysilicon layer. This provides an advantage that polysilicon is a convenient material to use for the layer because it is easy to deposit using conventional semiconductor fabrication equipment.

The polysilicon layer may incorporate dopant impurity to a concentration in a range of $10^{18}$ to $10^{19}$ atoms cm$^{-3}$. Employing a dopant concentration in this range is advantageous because it is achievable using conventional semiconductor fabrication processes.

In a second embodiment, the concentrating means may be a heavily doped region of different chemical composition to the buried layer. This provides an advantage that the concentrating means may be preferentially adapted for injecting charge carriers into the active region and the buried layer may be preferentially adapted for providing an electrical connection path to the concentrating means.

The buried layer may be a metal silicide layer. This provides an advantage that the silicide layer has a coefficient of resistivity of less than 1.5 $\mu\Omega$m and thereby provides a reduced resistance connection path to the concentrating means compared to the prior art, thereby resulting in reduced device operating dissipation.

The buried layer may be a tungsten suicide layer. This provides an advantage that tungsten silicide is capable of withstanding high temperatures in the order of 1000° C. required for performing subsequent processing steps for fabricating the device.

The buried layer may be any one of tantalum silicide layer, a cobalt silicide layer and a titanium silicide layer. This provides an advantage of a range of materials which may be preferentially employed for fabricating the buried layer.

The concentrating means and the buried layer may share a like dopant impurity providing conductivity in the former. This provides an advantage that the concentrating means may be selectively doped and act as a source of dopant during device fabrication.

In another aspect of the invention, a method of fabricating a device of the invention may include the steps of:

(a) providing first and second wafer elements;

(b) providing the wafer elements with a layer structured to define injecting means for injecting charge carriers into an active device region for radiation propagation;

(c) providing one of the wafer elements with a metal silicide or a polysilicon layer to provide injecting means;

(d) bonding the wafer elements to form a wafer couplet within which the metal silicide layer or the polysilicon layer is buried; and (e) processing the couplet to define the active device region.

The method provides an advantage of providing a process for fabricating the device which is not possible to fabricate using conventional prior art techniques, for example fabrication of the device is not presently feasible using epitaxial techniques to deposit successive layers onto a wafer.

In another aspect of the invention, a device according to the invention may be fabricated by using the method referred to above.

BRIEF DESCRIPTION OF THE DRAWINGS

In order that the invention might be more fully understood, embodiments thereof will now be described, by way of example only, with reference to the accompanying drawings in which.

DETAILED DISCUSSION OF PREFERRED EMBODIMENTS

Figure 1:
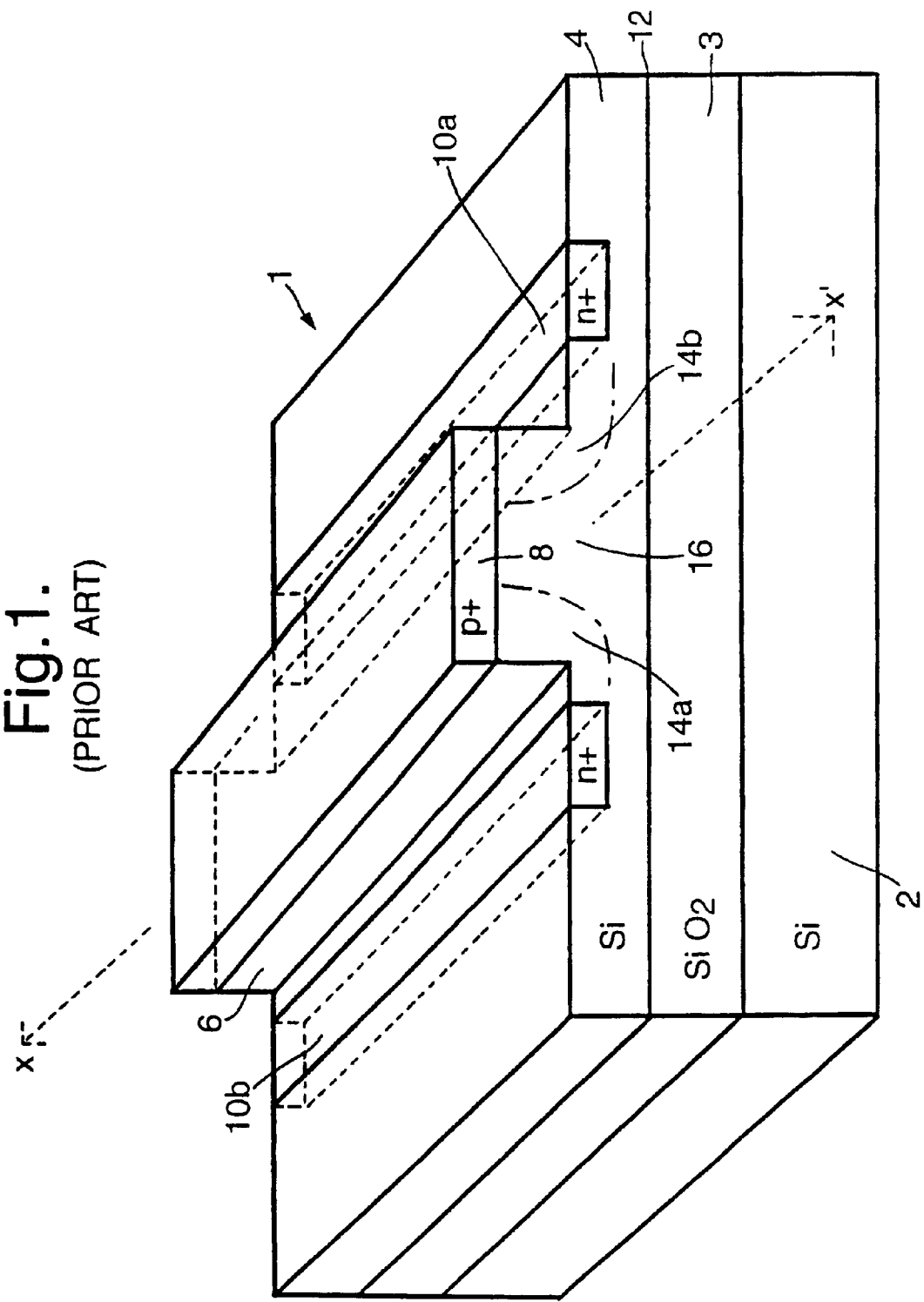
FIG. 1 is a schematic perspective view of a prior art plasma dispersion optical modulator device.

Referring to FIG. 1, there is shown a schematic view of a prior art plasma dispersion optical modulator device indicated generally by 1. It incorporates in sequence a silicon substrate 2, a silicon dioxide (SiO$_2$) layer 3 and a silicon surface layer 4. The substrate 2, the silicon dioxide layer 3 and the surface layer 4 are parallel, overlaid and unitary. The surface layer 4 is low doped silicon having an impurity concentration of less than $10^{16}$ atoms cm$^{-3}$.

The surface layer 4 is etched back during fabrication of the device 1 to form an exposed rib 6. A reference axis x–x' is included in FIG. 1 and is orientated in a direction along the rib 6. The rib 6 is doped along its upper surface to form an elongate p+ electrode 8 thereonto. An exposed surface of the surface layer 4 is doped to form two elongate n+ electrodes 10a, 10b into the surface layer 4. The n+ electrodes 10a, 10b are adjacent at respective sides of the rib 6 but do not encroach onto it. The p+ electrode 8, the n+ electrodes 10a, 10b and the rib 6 are all aligned parallel to one another. An interface 12 is formed between the silicon dioxide layer 3 and the surface layer 4.

The electrodes 8, 10a, 10b are doped with impurities to a concentration in a range of $10^{18}$ to $10^{19}$ atoms $cm^{-3}$. The n+ electrodes 10a, 10b are doped with phosphorus and the p+ electrode 8 is doped with boron.

The electrodes 8, 10a, 10b are 2.5 mm long in a direction along the reference axis x–x' which is parallel to the rib 6. The rib 6 is 4 $\mu$m wide in a direction orthogonal to the axis x–x' and parallel to the surface layer 4. It is 6.5 $\mu$m high from the interface 12 in a normal direction therefrom. The surface layer 4 is 3.3 $\mu$m thick in a normal direction to the interface 12 in regions remote from the rib 6. The electrodes 10a, 10b are 5 $\mu$m wide in a direction orthogonal to the axis x–x' and parallel to the surface layer 4. They are 0.5 $\mu$m deep in a normal direction to the exposed surface of the surface layer 4.

Operation of the prior art optical modulator device 1 will now be described with reference to FIG. 1. The rib 6 forms a monomode optical waveguide along which optical radiation of wavelength in a range of 1.3 $\mu$m to 1.5 $\mu$m, in particular radiation of 1.3 $\mu$m and 1.5 $\mu$m wavelength which is often employed in optical communication systems, propagates with low loss of less than 1 dB $cm^{-1}$. The radiation is confined within this waveguide by virtue of differing refractive indices of the rib 6, the silicon dioxide layer 3 and a low dielectric constant medium such as air or cladding film (not shown) surrounding the optical modulator device 1.

The electrodes 8, 10a, 10b and the rib 6 form a p-i-n diode. When a potential difference is applied to bias the p+ electrode 8 at a higher potential than the n+ electrodes 10a, 10b, the p-i-n diode becomes forward biased and charge carriers are injected into the waveguide. The electrodes 8, 10a, 10b are configured such that the potential difference results in generation of an electric field which is concentrated in edge regions 14a, 14b relative to a central region 16 of the rib 6. As a result of this, charge carriers injected from the electrodes 8, 10a, 10b are concentrated principally in the edge regions 14a, 14b. In consequence, a greater change of refractive index occurs due to the plasma-dispersion effect in the edge regions 14a, 14b relative to the central region 16. Optical radiation propagating in the waveguide is mainly confined to the central region 16 and is therefore only weakly affected by the injected carriers in the edge regions 14a, 14b.

The charge carriers injected into the rib 6 result in refractive index changes therein and thereby phase modulation of the optical radiation propagating along it. This phase modulation is converted into amplitude modulation of the optical radiation by incorporating the modulator device 1 into one arm of a Mach-Zehnder interferometer (not shown).

A variant of the modulator device 1 is found in the prior art. In the variant, the n+ electrodes 10a, 10b are not incorporated. Instead, the substrate 2 is doped with phosphorus donor impurity to a concentration in a range of $10^{18}$ to $10^{19}$ atoms $cm^{-3}$ and an electrical connection from the substrate 2 through the silicon dioxide layer 3 to the surface layer 4 is provided remotely from the rib 6. In the variant, the substrate 2 provides a first electrode of a p-i-n diode and the p+ electrode 8 provides a second electrode of the diode. Biasing the p+ electrode 8 at a higher potential than the substrate 2 in this variant results in charge carriers being injected into the rib 6 and thereby modulating radiation propagating therealong.

A problem encountered in the modulator device 1 shown in FIG. 1 and the variant described above is that the p-i-n diode formed therein has a relatively high series resistance, for example the diode has a series resistance of 1 k$\Omega$ when the rib 6 and its p+ electrode 8 are approximately 1 mm long. Capacitance between the substrate 2 or the electrodes 10a, 10b and the p+ electrode 8 in combination with the series resistance is a potential modulation bandwidth limiting factor.

Another problem encountered in the modulator device 1 and the variant is that power is dissipated in the series resistance. An example of this problem is where the modulator device 1 provides a usable modulation effect on radiation propagating along the rib 6 when it and its p+ electrode 8 are 1 mm long and 10 mA of current flows between the p+ electrode 8 and the n+ electrodes 10a, 10b; this results in a power dissipation of 114 mW when the series resistance is 1 k$\Omega$ and requires a 11.4 volt potential to be applied between the p+ electrode 8 and the n+ electrodes 10a, 10b or substrate 2 even though the p-i-n diode will conduct when approximately a 1.4 volt potential is applied to forward bias it. Thus, in this example, 14 mW power dissipation occurs within the waveguide 6 for achieving the modulation effect and 100 mW power dissipation occurs within the series resistance.

The modulator device 1 and the variant are fabricated using epitaxial layer deposition on a silicon substrate. It is presently not feasible to deposit doped semiconductor layers whose sheet resistivity is an order of magnitude less than 10 $\Omega$ per square for a layer thickness suitable for fabricating the device 1 and the variant, namely approximately 0.3 $\mu$m. Thus, it is presently not possible to reduce greatly the series resistance and hence diminish power dissipation within the device 1 and its variant.

Figure 2:
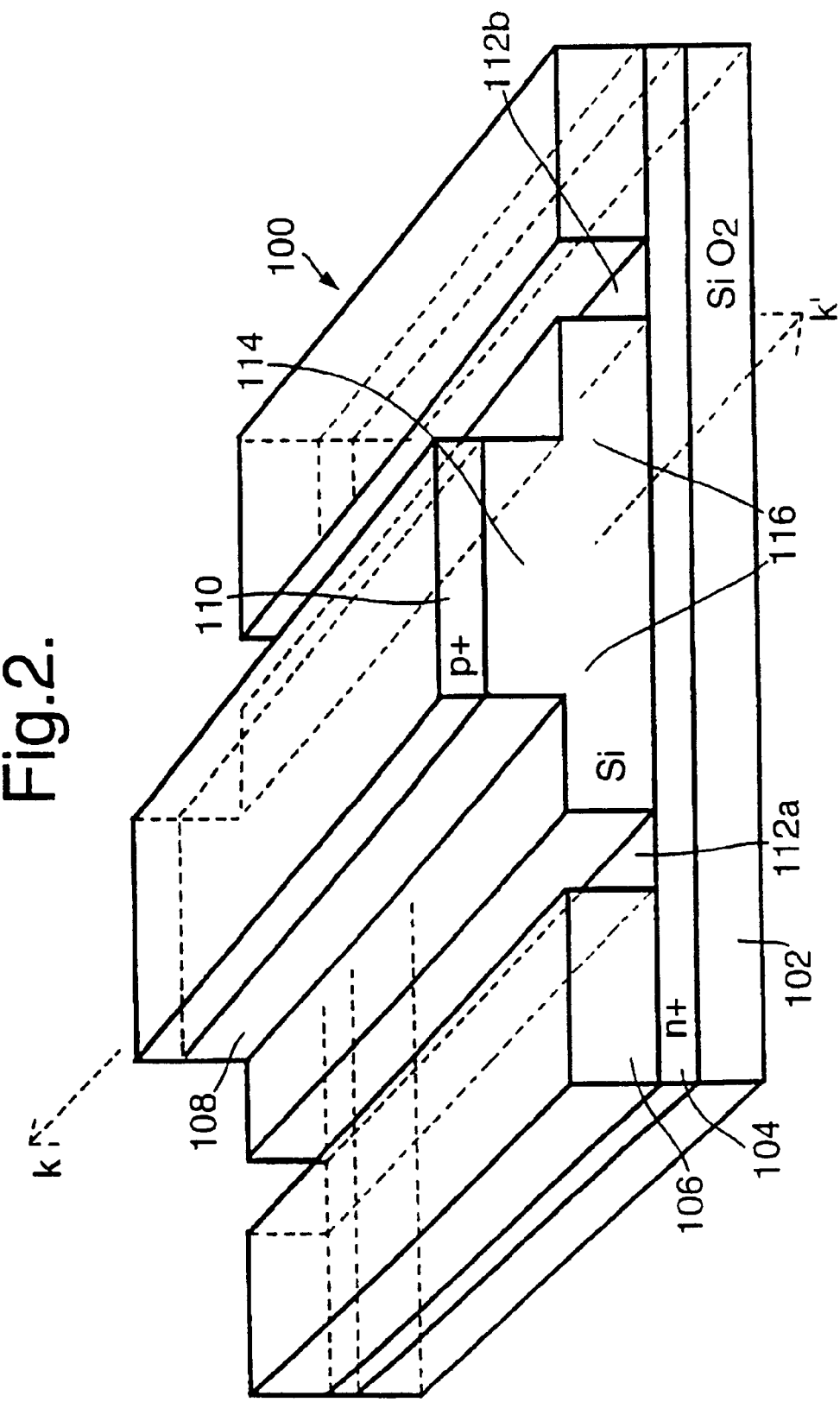
FIG. 2 illustrates in perspective an optical modulator device incorporating a buried conducting layer.

Referring now to FIG. 2, an optical device indicated generally by 100 comprises in sequence a silicon dioxide layer 102, a n+ doped silicon buried contact layer 104 and a silicon surface layer 106. The layers 102, 104, 106 are parallel, overlaid and unitary.

The surface layer 106 is etched to form an exposed rib 108. A reference axis k–k' is included in FIG. 2 and is orientated in a direction along the rib 108. An upper surface of the rib 108 is doped to form an elongate p+ electrode 110. The electrode 110 and the rib 108 are aligned parallel to one another. The surface layer 106 is selectively etched in regions remote from the rib 108 to form two via channels 112a, 112b for making electrical connection to the buried contact layer 104. Electrical connection is achieved by depositing doped polysilicon or metal tracks (not shown) into the channels 112a, 112b.

The p+ electrode 110 is doped with boron to an impurity concentration in a range of $10^{18}$ to $10^{19}$ atoms $cm^{-3}$. The rib 108 is 4 $\mu$m wide in a direction orthogonal to the axis k–k' and parallel to the surface layer 106. It is 6.5 $\mu$m high from the buried contact layer 104 in a normal direction therefrom. The surface layer 106 is 3.3 $\mu$m thick in a direction normal to the buried contact layer 104 in regions remote from the rib 108. The contact layer 104 is 0.1 $\mu$m thick and is doped with an electron donor impurity to a concentration in a range of $10^{18}$ to $10^{19}$ atoms $cm^{-3}$. The silicon dioxide layer 102 is at least 1 μm thick for reducing leakage toss of optical radiation along the rib 108.

The operation of the device 100 will now be described. The rib 108 forms a waveguide along which optical radiation of wavelength in a range of 1.3 μm to 1.5 μm propagates, in particular radiation of 1.3 μm and 1.5 μm wavelength which is often employed in optical communication systems. The radiation is confined within the waveguide by a difference in refractive index between the rib 108, the buried contact layer 104, the silicon dioxide layer 102 and a low dielectric constant medium surrounding the device 100.

When a potential difference is applied to bias the p+ electrode 110 at a higher potential than the buried contact layer 104, charge carriers are injected predominantly into a central region 114 of the rib 108. A charge distribution is thereby generated where there is a greater concentration of the carriers in the central region 114 in which a majority of the optical radiation is confined in comparison to edge regions 116 of the rib 108. The carriers injected into the waveguide thereby efficiently modulate the radiation in comparison to the prior art modulator device 1 in FIG. 1. In the device 100, the injected carriers provide phase modulation of the radiation within the waveguide. This phase modulation is converted to amplitude modulation by inserting the device 100 into one arm of a Mach-Zehnder interferometer (not shown) in a similar manner to the prior art modulator device 1.

Figure 3:
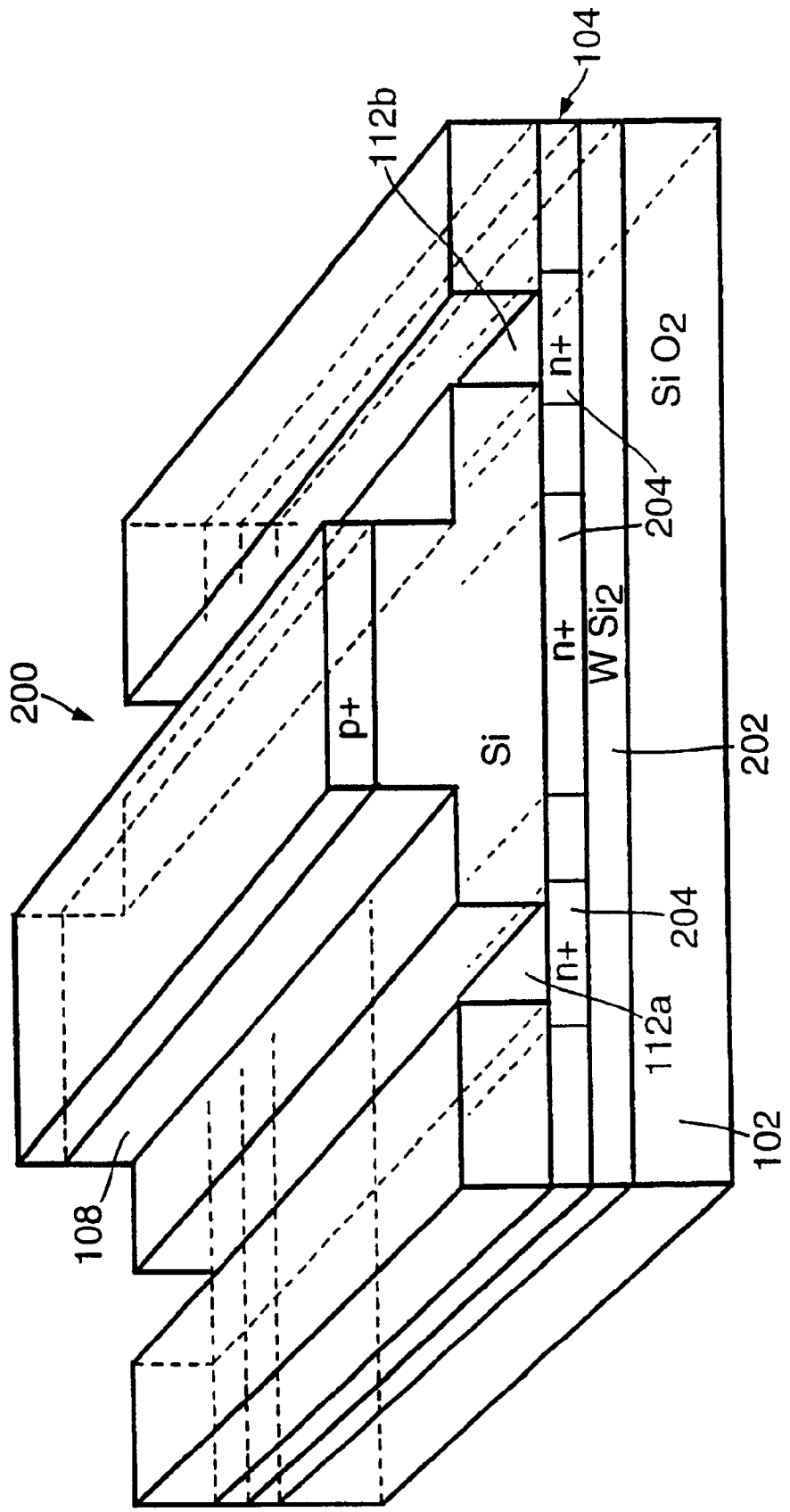
FIG. 3 illustrates in perspective an optical device of the invention as in FIG. 2 incorporating a buried tungsten silicide layer.

Referring now to FIG. 3, an alternative optical device of the invention is indicated by 200. It is identical to the device 100 in FIG. 2 except that a buried tungsten suicide layer (W Si$_2$) 202 is included between the silicon dioxide layer 102 and the buried contact layer 104, and the layer 104 is selectively doped in regions 204 near the channels 112a, 112b and the rib 108. The silicide layer 202 is 100 nm thick.

The tungsten silicide layer 202 has a greater conductivity than the buried contact layer 104. It reflects optical radiation efficiently, thereby providing improved confinement of radiation within the rib 108. Moreover, the silicide layer 202 also provides a lower resistance connection to all regions of the contact layer 104 thereby enhancing high frequency modulating performance of the device 200. The regions 204 in the buried layer 104 are formed by selectively implanting a dopant into the silicide layer 202 and then subsequently diffusing the dopant into the contact layer 104 after wafer bonding which will be described later.

Figure 4:
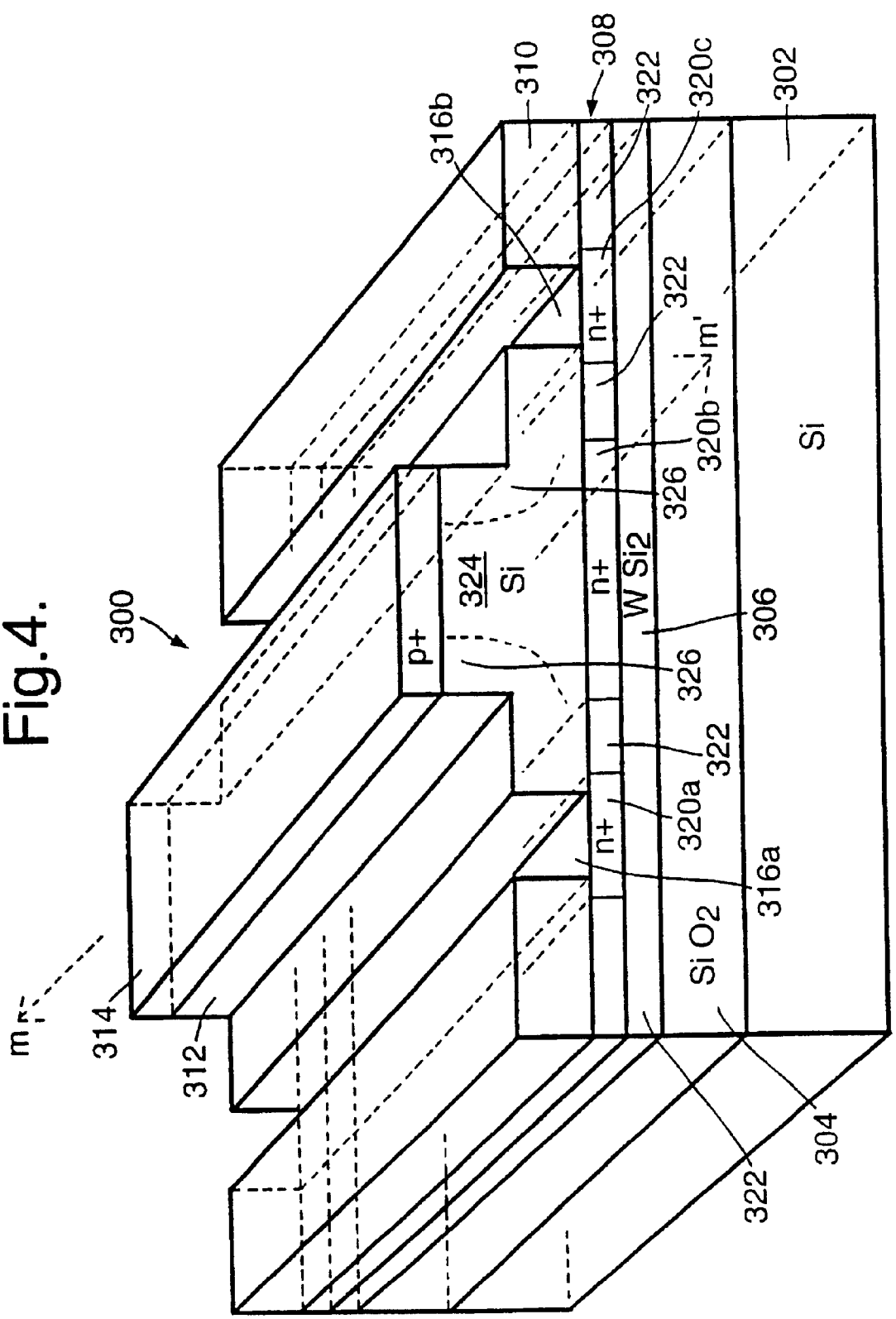
FIG. 4 illustrates in perspective an optical device of the invention as in FIG. 3 incorporating a silicon substrate.

Referring now to FIG. 4, an optical device of the invention indicated generally by 300 comprises in sequence a silicon substrate 302, silicon dioxide layer 304, a buried tungsten silicide layer (W Si$_2$) 306, a n+ doped silicon buried contact layer 308 and a silicon surface layer 310. The layers 302 to 310 are parallel, overlaid and unitary.

The surface layer 310 is etched to form an exposed rib 312. A reference axis m–m' is included in FIG. 4 and is orientated in a direction along the rib 312. An upper surface of the rib 312 is doped to form an elongate p+ electrode 314. The electrode 314 and the rib 312 are aligned parallel to one another. The surface layer 310 is selectively etched in regions remote from the rib 312 to form two via channels 316a, 316b for making electrical connection to the buried contact layer 308. Electrical connection is achieved by depositing doped polysilicon or metal tracks (not shown) into the channels 316a, 316b. The layer 308 is selectively doped in regions 320a, 320c near the channels 316a, 316b and in a region 320b near the rib 312, resulting in lesser doped regions 322 between the regions 320a, 320b, 320c. The silicide layer 306 is in a range of 100 nm to 250 nm thick.

The p+ electrode 314 is doped with boron to an impurity concentration in a range of $10^{18}$ to $10^{19}$ atoms cm$^{-3}$. The rib 312 is 4 μm wide in a direction orthogonal to the axis m–m' and parallel to the surface layer 310. It is 6.5 μm high from the buried contact layer 308 in a normal direction therefrom. The surface layer 310 is 3.3 μm thick in a direction normal to the buried contact layer 308 in regions remote from the rib 312. The contact layer 308 is 0.1 μm thick and is doped with an electron donor impurity to a concentration in a range of $10^{18}$ to $10^{19}$ atoms cm$^{-3}$. The silicon dioxide layer 304 is at least 1 μm thick for reducing leakage loss of optical radiation from the rib 312.

The operation of the device 300 will now be described. The rib 312 forms a waveguide along which optical radiation of wavelength in a range of 1.3 μm to 1.5 μm propagates, in particular radiation of 1.3 μm and 1.5 μm wavelength which is often employed in optical communication systems. The radiation is confined within the waveguide by a difference in refractive index between the rib 312, the buried contact layer 308, the silicide layer 306, the silicon dioxide layer 304 and a low dielectric constant medium (not shown) surrounding the device 300.

When a potential difference is applied to bias the p+ electrode 314 at a higher potential than the buried contact layer 308, charge carriers are injected predominantly into a central region 324 of the rib 312. A charge distribution is thereby generated where there is a greater concentration of the carriers in the central region 324 in which a majority of the optical radiation is confined in comparison to edge regions 326 of the rib 312. The carriers injected into the waveguide thereby efficiently modulate the radiation in comparison to the prior art modulator device 1 in FIG. 1. In the device 300, the injected carriers provide phase modulation of the radiation within the waveguide. This phase modulation is converted to amplitude modulation by inserting the device 300 into one arm of a Mach-Zehnder interferometer (not shown) in a similar manner to the prior art modulator device 1.

The tungsten suicide layer 306 has a greater conductivity than the buried contact layer 308. It reflects optical radiation efficiently, thereby providing improved confinement of radiation within the rib 312. Moreover, the silicide layer 306 also provides a lower resistance connection to all regions of the contact layer 308 thereby enhancing high frequency modulating performance of the device 300 and reducing power dissipation therein. Series resistance of the device 300 may be reduced by an order of magnitude compared to prior art devices of equivalent size.

The regions 320a, 320b, 320c in the buried contact layer 308 are formed by selectively implanting a dopant into the silicide layer 306 and then subsequently diffusing the dopant into the buried contact layer 308 after wafer bonding which will be described later.

Selectively doping the regions 320a, 320b, 320c provides an advantage that current flowing through the via channels 316a, 316b is predominantly diverted into the silicide layer 306, and injection of carriers from the region 320b occurs predominantly into the central region 324 of the rib 312 thereby improving modulation efficiency of the device 300. The layer 306 has a coefficient of resistivity of less than 1.5 μΩm, namely a sheet resistivity of less than 7.5 Ω per square when the layer 306 is 200 nm thick. A silicon enriched tungsten silicide film having a composition W Si$_{2.7}$ has been experimentally characterised and found to have a coefficient of resistivity of approximately 0.4 μΩm which corresponds to a sheet resistivity of approximately 2 Ω per square for a 200 nm film thickness.

In a simplified version of the device 300, selective doping is not applied to the regions 320a, 320b, 320c. Instead, the contact layer 308 is substantially uniformly doped. As an alternative to fabricating the layer 306 using tungsten silicide, at least one of titanium silicide, tantalum silicide and cobalt silicide may be used.

The silicon dioxide layer 304 electrically isolates the silicon substrate 302 from the silicide layer 306. This provides an advantage of isolating the rib 312 from the substrate 302 so that potentials applied to inject charge carriers into the rib 312 are not restricted by potential of the substrate 302 as in prior art optical devices described earlier.

Figure 5:
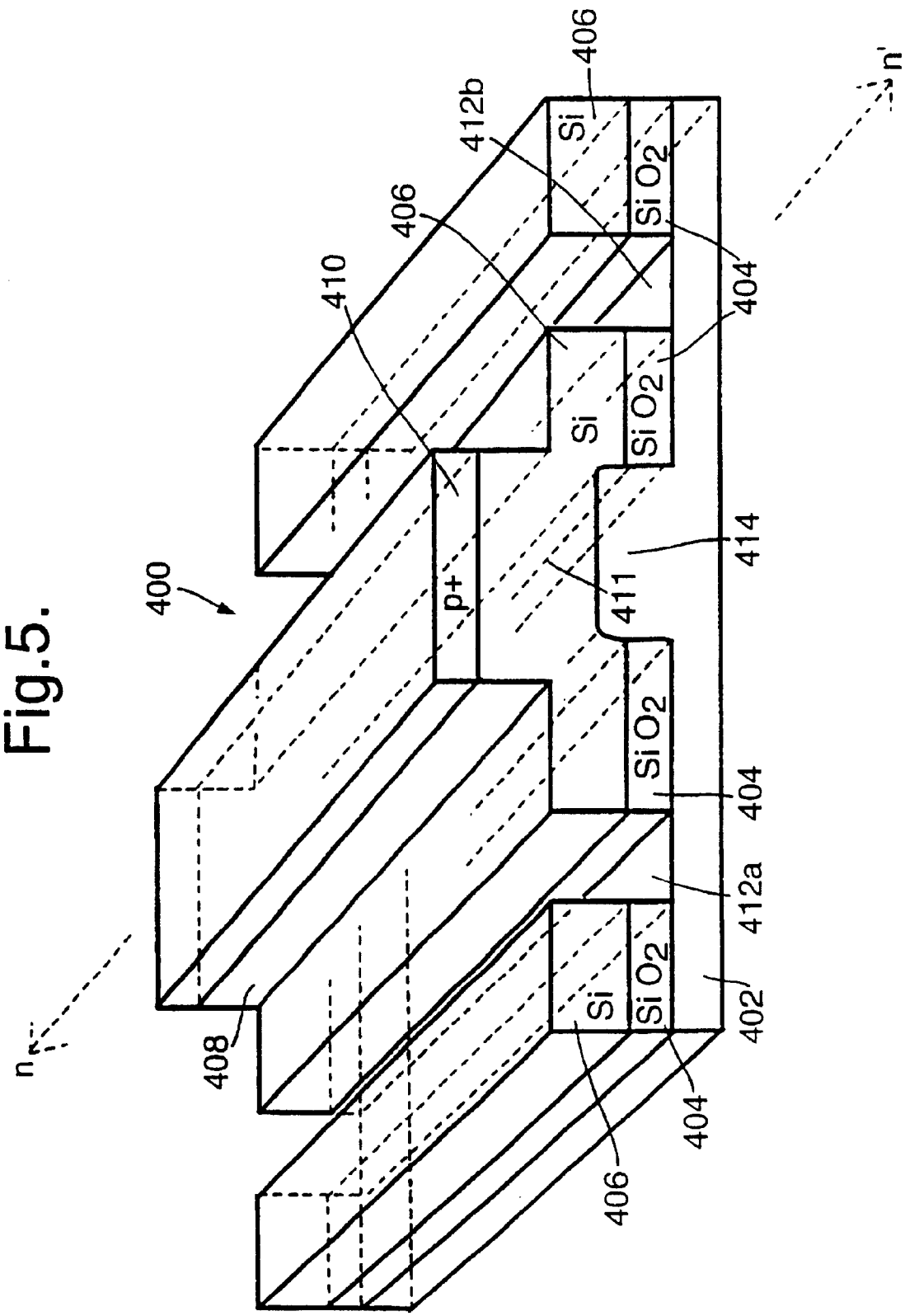
FIG. 5 illustrates in perspective an optical device of the invention incorporating a polysilicon n+ doped conduction layer and an associated elongate n+ doped electrode region.

Another optical device of the invention is indicated by 400 in FIG. 5. It comprises in sequence a polysilicon n+ phosphorus doped conduction layer 402, a silicon dioxide insulating buried layer 404 and a silicon surface layer 406. The surface layer 406 is low doped silicon with an impurity concentration of less than $10^{16}$ atoms cm$^{-3}$. It is etched back to form an exposed rib 408. A reference axis n–n' is included in FIG. 5 and is orientated in a direction along the rib 408. An upper surface of the rib 408 is doped with boron impurity to form an elongate p+ electrode 410. The rib 408 and the p+ electrode 410 are aligned parallel to one another. A central region 411 of the rib 408 is situated beneath the p+ electrode 410. Via channels 412a, 412b are remote from the rib 408 and are formed by etching through the surface layer 406 and the buried layer 404 to the conduction layer 402 to enable electrical connection to be made to it. Electrical connection to the conduction layer 402 is achieved by depositing doped polysilicon or metal tracks into the via channels 412a, 412b. An elongate n+ doped electrode region 414 is formed by selectively etching through the insulating buried layer 404 and a short distance of 0.5 µm into the surface layer 406 to form a channel in which doped polysilicon of the layer 402 is deposited. The electrode region 414 is aligned along the axis n–n' and is situated on an opposite side of the central region 411 relative to the p+ electrode 410. The rib 408 is a monomode waveguide for confinement of optical radiation of wavelength in a range of 1.3 µm and 1.5 µm, in particular radiation of 1.3 µm and 1.5 µm wavelength which is often employed in optical communication systems.

The conduction layer 402 and p+ electrode 410 are doped with impurity atoms to a concentration in a range of $10^{18}$ to $10^{19}$ atoms cm$^{-3}$. The rib 408 is identical in size to the rib 108 illustrated in FIG. 3. The surface layer 406 is 3.3 µm thick in regions remote from the rib 408.

When a potential difference is applied to bias the p+ electrode 410 at a higher potential than the electrode region 414, charge carriers are injected into the central region 411. The electrode region 414 is truncated widthwise to ensure that injected charge carriers are predominantly confined to the region 411 and thereby efficiently modulate its refractive index. Because of this confinement, interelectrode capacitance between the p+ electrode 410 and electrode region 414 is less in the device 400 in comparison to interelectrode capacitance of the modulator device 1 for achieving an equivalent change in refractive index of the rib 6. This relatively smaller interelectrode capacitance provides an enhanced operating bandwidth for the device 400 in FIG. 5.

Figure 6:
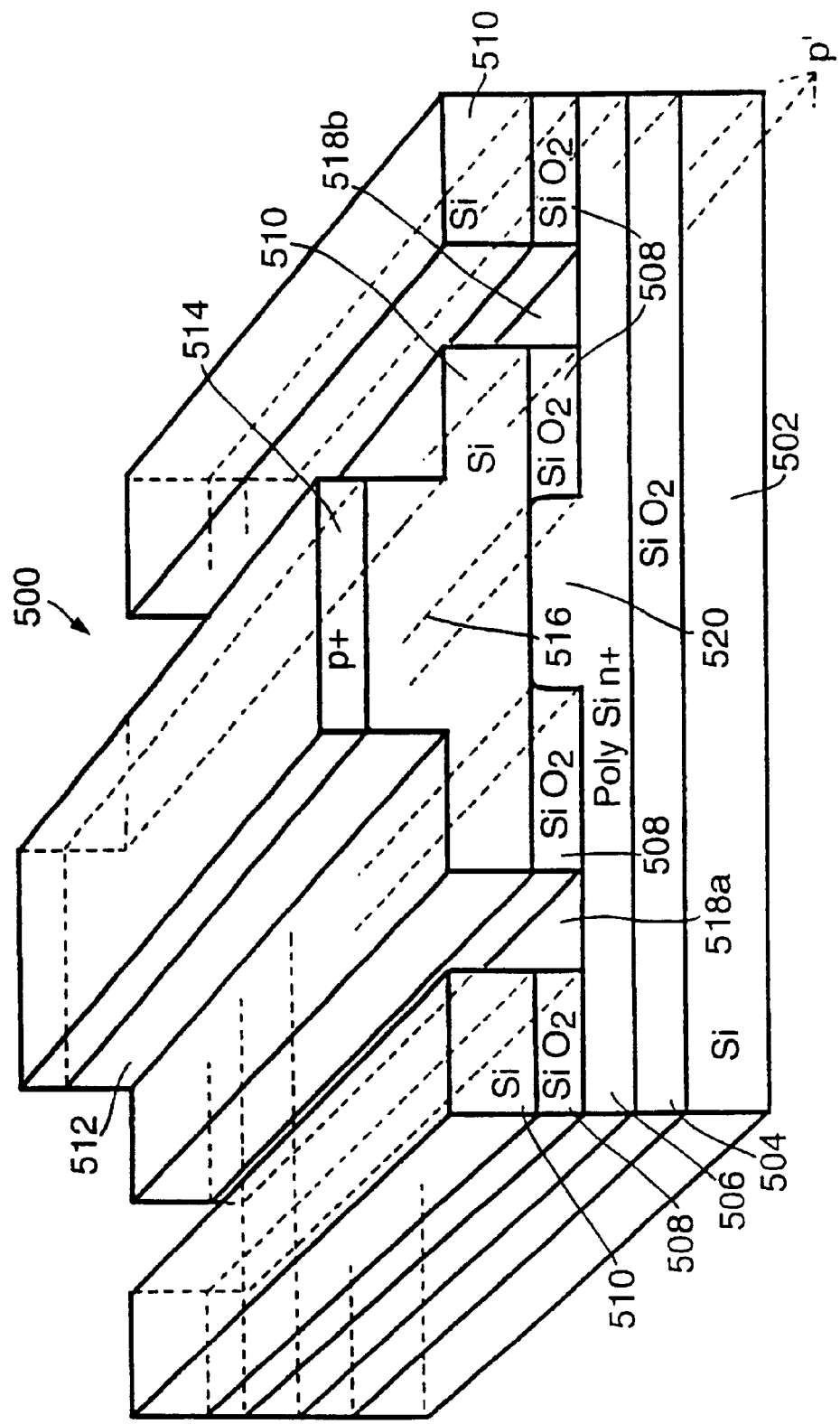
FIG. 6 illustrates in perspective an optical device of the invention as in FIG. 5 incorporating a silicon dioxide buried layer and a silicon substrate.

Another optical device of the invention is indicated by 500 in FIG. 6. It comprises in sequence a silicon substrate 502, a first silicon dioxide insulating buried layer 504, a polysilicon n+ phosphorus doped conduction layer 506, a second silicon dioxide insulating buried layer 508 and a silicon surface layer 510. The surface layer 510 is low doped silicon with an impurity concentration of less than $10^{16}$ atoms cm$^{-3}$. It is etched back to form an exposed rib 512. A reference axis p–p' is included in FIG. 6 and is orientated in a direction along the rib 512. An upper surface of the rib 512 is doped with boron impurity to form an elongate p+ electrode 514 along it. The rib 512 and the p+ electrode 514 are aligned parallel to one another. A central region 516 of the rib 512 is situated beneath the p+ electrode 514. Via channels 518a, 518b are remote from the rib 512 and are formed by etching through the surface layer 510 and the second buried layer 508 to the conduction layer 506 to enable electrical connection to be made to it. Electrical connection to the conduction layer 506 is achieved by depositing doped polysilicon or metal tracks (not shown) into the via channels 518a, 518b. An elongate n+ doped electrode region 520 is formed by selectively etching through the second insulating buried layer 508 to form a channel in which doped polysilicon of the layer 506 is deposited. The electrode region 520 is aligned along the axis p–p' and is situated on an opposite side of the central region 516 relative to the p+ electrode 514. The rib 512 is a monomode waveguide for confinement of optical radiation of wavelength in a range of 1.3 µm and 1.5 µm, in particular radiation of 1.3 µm and 1.5 µm wavelength which is often employed in optical communication systems.

The conduction layer 506 and the p+ electrode 514 are doped with impurity atoms to a concentration in a range of $10^{18}$ to $10^{19}$ atoms cm$^{-3}$. The rib 512 is identical in size to the rib 108 illustrated in FIG. 2. The surface layer 510 is 3.3 µm thick in regions remote from the rib 512.

When a potential difference is applied to bias the p+ electrode 514 at a higher potential than the electrode region 520, charge carriers are injected into the central region 516. The electrode region 520 is truncated widthwise to ensure that injected charge carriers are predominantly confined to the region 516 and thereby efficiently modulate its refractive index. Because of this confinement, interelectrode capacitance between the p+ electrode 514 and the electrode region 520 is less in the device 500 in comparison to interelectrode capacitance of the modulator device 1 for achieving an equivalent change in refractive index of the rib 6. This relatively smaller interelectrode capacitance provides an enhanced operating bandwidth for the device 500 in FIG. 6.

Figure 7:
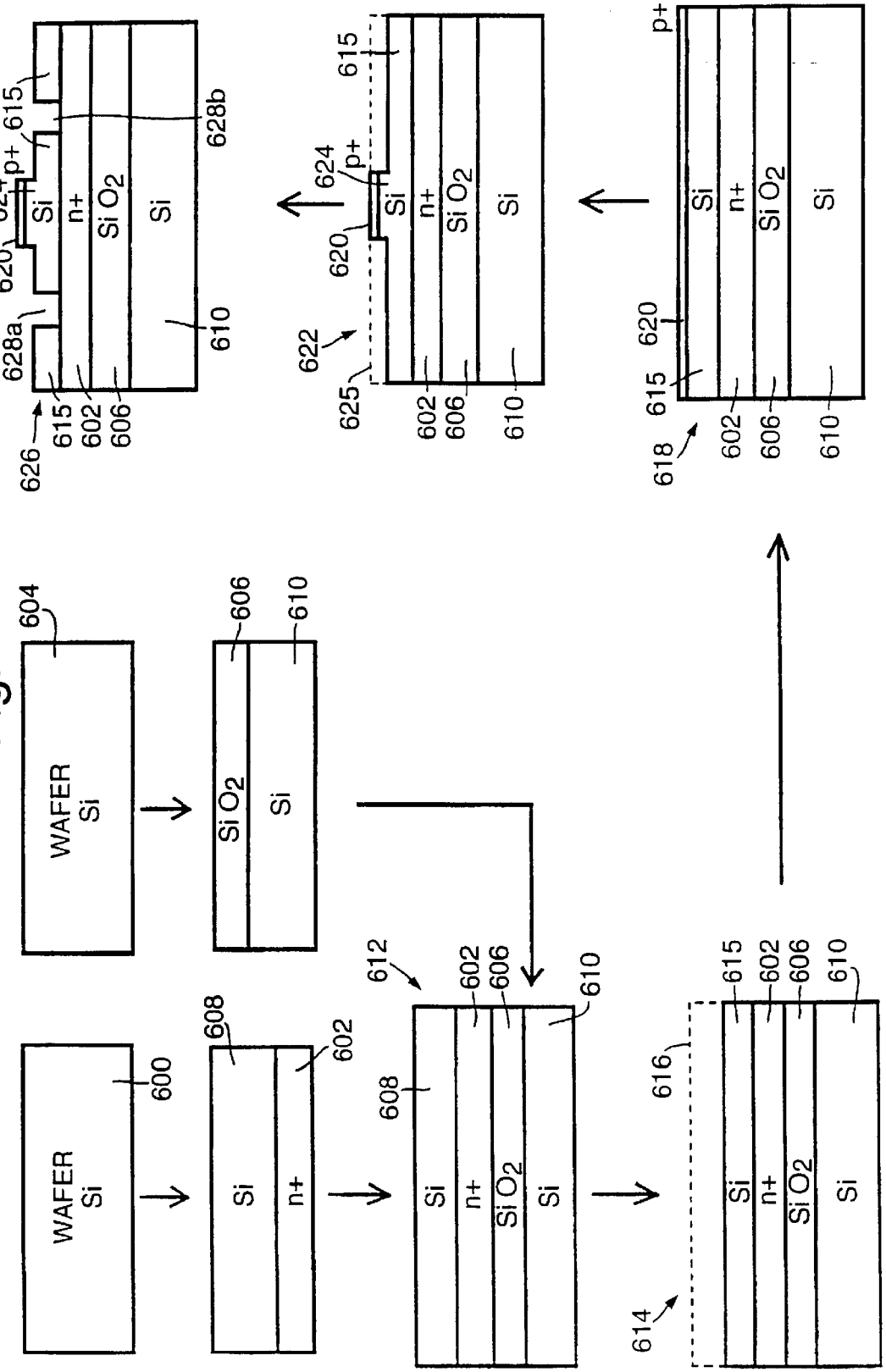
FIG. 7 illustrates stages in a microfabrication process for producing the optical device in FIG. 2.

Referring now to FIG. 7, there is shown schematically stages in a microfabrication process for producing the device 100. A polished low doped silicon wafer 600 containing a dopant impurity to a concentration of less than $10^{16}$ atoms cm$^{-3}$ is exposed to ion implantation to form a heavily n+ doped layer 602 on one side of it. The layer 602 contains a dopant impurity to a concentration in a range of $10^{18}$ to $10^{19}$ atoms cm$^{-3}$. A second polished low doped silicon wafer 604 is thermally oxidised to form a thick silicon dioxide surface layer 606 on one side of it. Layers 608, 610 correspond to low doped silicon regions of the wafers 600, 604 respectively. The layers 602, 606 are then thermally bonded together at a high temperature of 1100° C. in an atmosphere of wet oxygen and nitrogen such that they fuse together to form a wafer couplet indicated by 612. The atmosphere is created by mixing oxygen, hydrogen and nitrogen gases which spontaneously react at the high temperature to form a gaseous mixture of steam, oxygen and nitrogen. The couplet 612 is then polished to form a thinned wafer couplet indicated by 614 in which the layer 608 is polished to remove material as indicated by a dashed line 616 to form a thinned layer 615. Next, the couplet 614 is exposed to ion implantation to form a heavily doped p+ surface layer 620 with an impurity to a concentration in a range of $10^{18}$ to $10^{19}$ atoms cm$^{-3}$, thereby producing a wafer couplet indicated by 618. Standard microfabrication lithographic and dry etching processes are then employed to etch the layers 615, 620 to form a rib 624 in a wafer couplet indicated by 622. A dashed line 625 indicates an amount of material removed during formation of the rib 624. Next, via channels 628a, 628b are formed by using standard lithographic and etching processes, thereby producing a wafer couplet indicated by 626. Further processing stages (not shown) on the couplet 626 include metal track deposition for electrical connection to the n+ doped layer 602 and to the p+ surface layer 620 remaining to provide a completed optical device.

Fabrication of the device 200 in FIG. 3 is similar to the device 100 in FIG. 2 except that the tungsten suicide layer 202 is deposited prior to bonding wafers to form a couplet.

The process shown schematically in FIG. 7 is known as "Bond and Etchback Silicon on Insulator" (BESOI). It has not been used in the prior art for fabrication of optical devices for modulating radiation.

Figure 8:
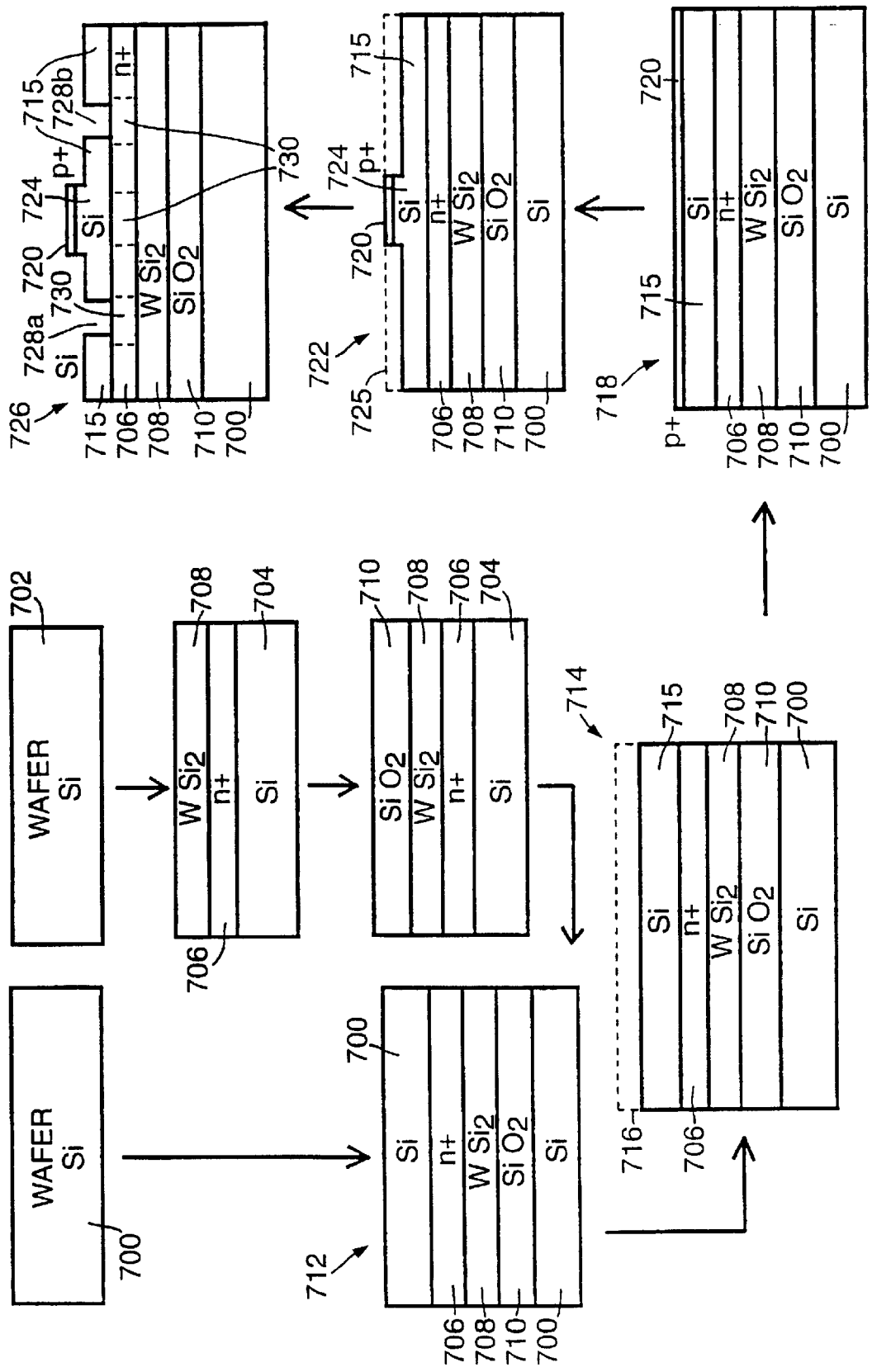
FIG. 8 illustrates stages in a microfabrication process for producing the optical device in FIG. 3 and 4.

Referring now to FIG. 8, there is shown schematically stages in a microfabrication process for producing the devices 200, 300.

Two polished low doped silicon wafers, namely a first wafer 700 and a second wafer 702, containing a dopant impurity to a concentration of less than $10^{16}$ atoms $cm^{-3}$ are required for producing the device 200, 300. The second wafer 702 is exposed to ion implantation to form a heavily n+ doped layer 706 on one side of it. The layer 706 contains a dopant impurity to a concentration in a range of $10^{18}$ to $10^{19}$ atoms $cm^{-3}$. The wafer 702 thereby becomes the layer 706 adjoined to a low doped layer 704. A tungsten silicide layer 708 is then grown by chemical vapour deposition onto the n+ doped layer 706. Next, a silicon dioxide surface layer 710 is grown onto the tungsten silicide layer 708 by chemical vapour deposition.

The first wafer 700 and the surface layer 710 are then thermally bonded together by holding them in contact for a period of 60 minutes at a high temperature of 1100° C. in an atmosphere of wet oxygen and nitrogen such that they fuse together to form a wafer couplet indicated by 712. The atmosphere is created by mixing oxygen, hydrogen and nitrogen gases which spontaneously react at the high temperature to form a gaseous mixture of steam, oxygen and nitrogen. The couplet 712 is then polished to form a thinned wafer couplet indicated by 714 in which the first wafer 700 is polished to remove material as indicated by a dashed line 716 to form a thinned layer 715. Next, the couplet 714 is exposed to ion implantation to form a heavily doped p+ surface layer 720 with an impurity to a concentration in a range of $10^{18}$ to $10^{19}$ atoms $cm^{-3}$, thereby producing a wafer couplet indicated by 718. Standard microfabrication lithographic and dry etching processes are then employed to etch the layers 715, 720 to form a rib 724 in a wafer couplet indicated by 722. A dashed line 725 indicates an amount of material removed during formation of the rib 724. Next, via channels 728a, 728b are formed by using standard lithographic and etching processes, thereby producing a wafer couplet indicated by 726. Further processing stages (not shown) on the couplet 726 include metal track deposition for electrical connection to the n+ doped layer 706 and to the p+ surface layer 720 remaining to provide a completed optical device.

Regions 730 at the via channels 728a, 728b and beneath the rib 724 incorporate enhanced doping to increase their conductivity and correspond to the regions 204 of the device 200 and the regions 320a, 320b, 320c of the device 300. They are formed by at least one of:

(i) selectively supplementing doping of the n+ doped layer 706 when formed on the second wafer 702; and (ii) selectively doping the tungsten silicide layer 708 with a dopant and then arranging for the dopant to diffuse into the n+ doped layer 706 to selectively dope it.

The process shown schematically in FIG. 8 is known as "Bond and Etchback Silicon on Insulator" (BESOI). It is known from prior art that bonds formed between silicide layers and silicon layers are highly stressed, hence it would not be expected that optical devices employing buried silicide layers could function reliably or could even be fabricated. Delamination of bonded silicide layers as a result of stress is described in detail on pages 50 to 59 in a book "Silicides for VLSI Applications" by S. P. Murarka, Published by Academic Press 1983 ISBN 0-12-511220-3. Buried silicide layers have not therefore been used in prior art for fabricating optical devices. During fabrication of the devices 200, 300 illustrated in FIGS. 3 and 4, it has been found that bonding of the tungsten silicide layer 708 to the n+ doped layer 706 and the silicon dioxide layer 710 is enhanced by adjusting stochiometric composition of the silicide layer 708 so that it is silicon enriched. Moreover, it has been found that bonding stresses between the silicide layer 708 to the n+ doped layer 706 and the silicon dioxide layer 710 may be reduced by selectively etching regions of the silicide layer 708, namely patterning it before growing the silicon dioxide layer 710 onto it. Such patterning may include regularly spaced isolation channels or holes, namely voids, where the silicide layer 708 has been selectively etched or eroded, for example using ion milling, away. Alternatively, the silicide layer 708 may be patterned so that it is incorporated as isolated islands of silicide.

Figure 9:
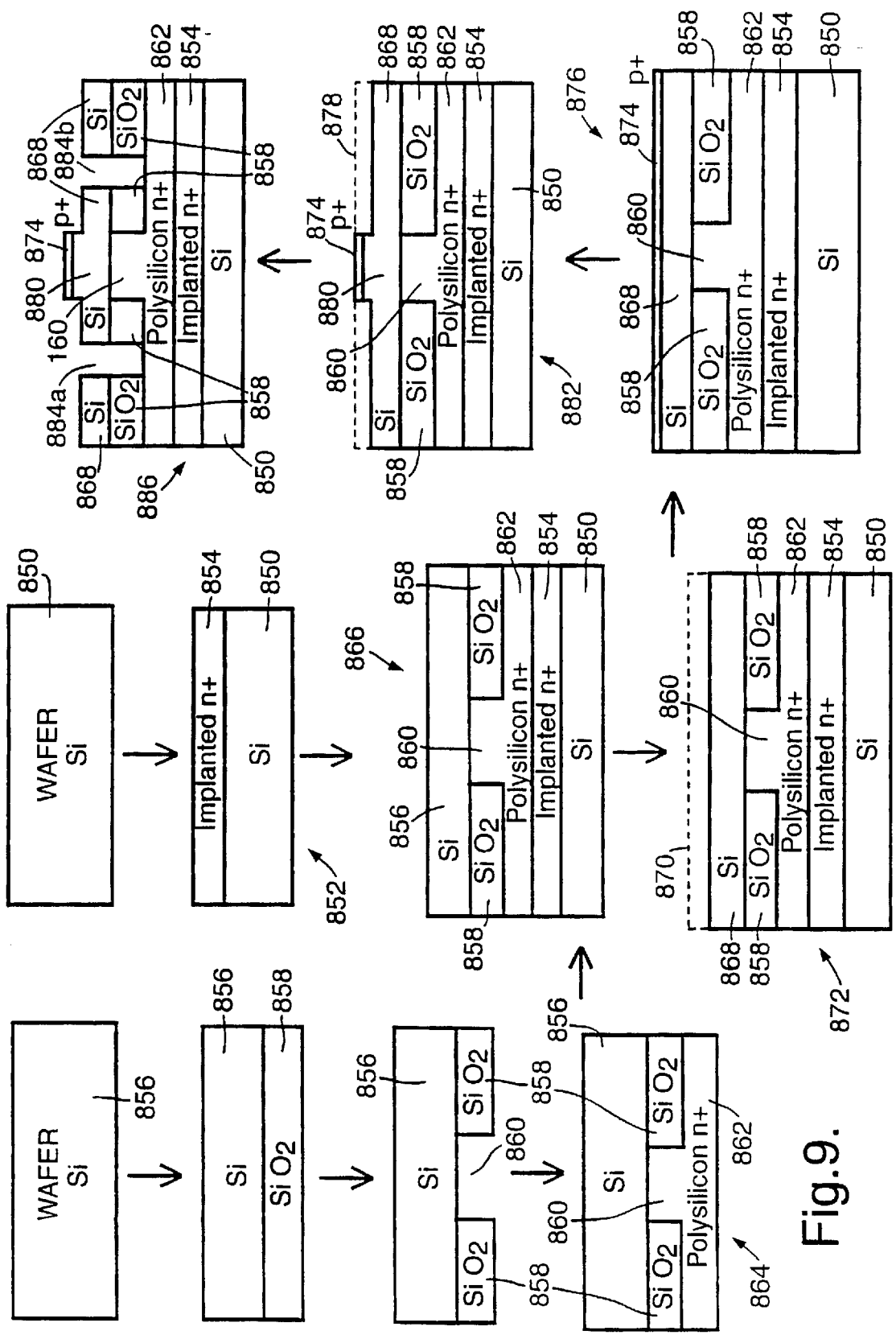
FIG. 9 illustrates stages in a microfabrication process for producing the optical device in FIG. 5.

Referring now to FIG. 9, there is shown schematically stages of a microfabrication process for producing the device 400 in FIG. 5. A low doped silicon wafer 850 containing a dopant impurity of concentration less than $10^{16}$ atoms $cm^{-3}$ is exposed to phosphorus dopant implantation to form a wafer indicated by 852 incorporating an implanted n+ surface layer 854 on it. The layer 854 contains dopant to a concentration in a range of $10^{18}$ to $10^{19}$ atoms $cm^{-3}$. A low doped silicon wafer 856 is oxidised to form a 1 μm thick surface silicon dioxide layer 858 onto it. A channel 860 is etched into the silicon dioxide layer 858 by employing standard microfabrication lithography and dry etching techniques. A doped polysilicon n+ layer 862 is then deposited onto the silicon dioxide layer 858 and into the channel 860. An exposed external surface of the layer 862 is then polished to planarise it to form a wafer indicated by 864. The wafers 852, 864 are abutted with the surface layer 854 contacting the polysilicon n+ layer 862 and then thermally bonded at a high temperature of 1100° C. in an atmosphere of wet oxygen and nitrogen to form a wafer couplet indicated by 866. The atmosphere is created by mixing oxygen, hydrogen and nitrogen gases which spontaneously react at the high temperature to form a gaseous mixture of steam, oxygen and nitrogen. The couplet 866 is polished to thin the wafer 856 contained therein to form a layer 868 where a dashed line 870 indicates a quantity of material removed by polishing to form a couplet indicated by 872. The layer 868 of the couplet 872 is exposed to boron impurity implantation to form a doped p+ surface layer 874 to provide a wafer couplet indicated by 876. The layer 868 is doped with boron impurity to a concentration in a range of $10^{18}$ to $10^{19}$ atoms $cm^{-3}$. By employing standard lithographic and dry etching techniques, the surface layer 874 and the layer 868 are etched back as indicated by a dashed line 878 except in an area to form a rib 880, thereby providing a wafer couplet indicated by 882. Two connection via channels 884a, 884b are then delineated and etched through the layers 858, 868 to provide a couplet indicated by 886. Further processing stages (not shown) on the couplet 886 include metal track deposition for electrical connection to the n+ layer 862 and to the p+ surface layer 874 remaining to provide a completed optical device.

Figure 10:
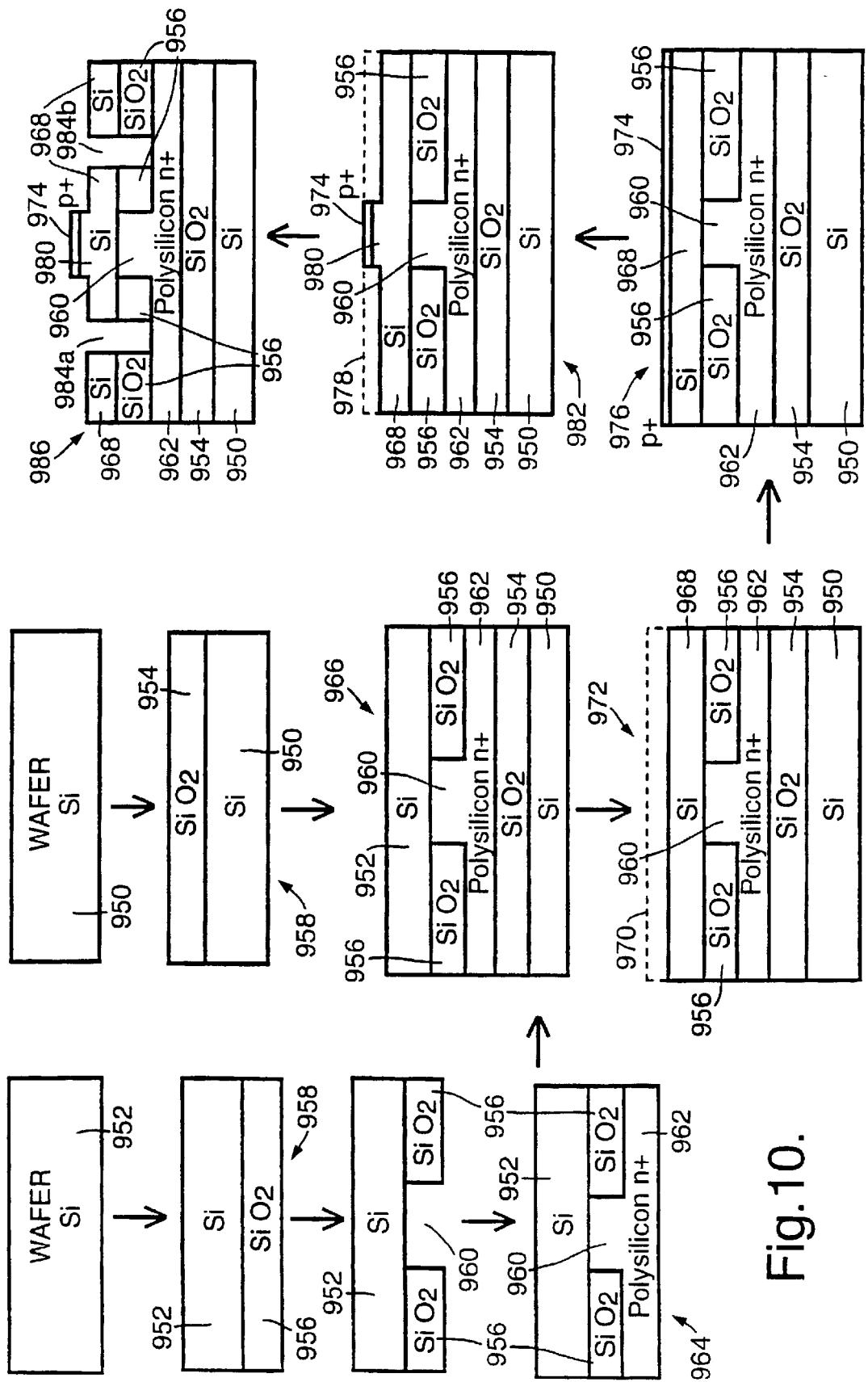
FIG. 10 illustrates stages in a microfabrication process for producing the optical device in FIG. 6.

Referring now to FIG. 10, there is shown schematically stages of a microfabrication process for producing the device 500. Two low doped silicon wafers, namely a first wafer 950 and a second wafer 952, containing a dopant impurity of concentration less than $10^{16}$ atoms $cm^{-3}$ are oxidised to form 1 µm thick silicon dioxide surface layers 954, 956 onto them respectively to form wafers indicated by 958, 959 respectively. A channel 960 is then etched into the silicon dioxide layer 956 by employing standard microfabrication lithography and dry etching techniques. A doped polysilicon n+ layer 962 is then deposited onto the silicon dioxide layer 956 and into the channel 960. An exposed external surface of the layer 962 is then polished to planarise it to form a wafer indicated by 964. The wafers 958, 964 are abutted with the surface layer 954 contacting the polysilicon n+ layer 962 and then, whilst being maintained in contact, thermally bonded at a high temperature of 1100° C. for a period of 60 minutes in an atmosphere of wet oxygen and nitrogen to form a wafer couplet indicated by 966. The atmosphere is created by mixing oxygen, hydrogen and nitrogen gases which spontaneously react at the high temperature to form a gaseous mixture of steam, oxygen and nitrogen. The couplet 966 is polished to thin the wafer 952 contained therein to form a layer 968 where a dashed line 970 indicates a quantity of material removed by polishing to form a couplet indicated by 972. The layer 968 of the couplet 972 is exposed to boron impurity implantation to form a doped p+ surface layer 974 to provide a wafer couplet indicated by 976. The layer 968 is doped with boron impurity to a concentration in a range of $10^{18}$ to $10^{19}$ atoms $cm^{-3}$. By employing standard lithographic and dry etching techniques, the surface layer 974 and the layer 968 are selectively etched back as indicated by a dashed line 978 except in an area to form a rib 980, thereby providing a wafer couplet indicated by 982. Two connection via channels 984a, 984b are then delineated and etched through the layers 956, 968 to provide a couplet indicated by 986. Further processing stages (not shown) on the couplet 986 include metal track deposition for electrical connection to the n+ layer 962 and to the p+ surface layer 974 remaining to provide a completed optical device.

In FIG. 10, a bonding interface is provided between the doped polysilicon n+ layer 962 and the silicon dioxide surface layer 954. In an alternative microfabrication process for fabricating the device 500, the surface layer 954 may be deposited onto the n+ layer 962 instead of onto the first wafer 950 so that a bonding interface is provided between the surface layer 954 and the first wafer 950.

It is not feasible to fabricate the devices 200, 300, 400, 500 illustrated in FIGS. 3 to 6 using epitaxial techniques. The tungsten silicide layer 202, 306, the polysilicon layer 402, 506 and the silicon dioxide layer 304, 504 are not monocrystalline. As a consequence of this, any layer grown epitaxially onto any of said layers 202, 304, 306, 402, 504, 506 will also not be monocrystalline. Thus, with said layers present, it is not feasible to grow epitaxially onto them monocrystalline layers suitable for fabricating the rib 108, 314, 408, 512. Hence, the processes illustrated in FIGS. 7 to 10 are essential for fabricating the devices 200, 300, 400, 500.

Referring now to FIGS. 2 to 6, the ribs 108, 312, 408, 512 may be gold doped in order to increase device operating bandwidth by ensuring rapid removal of charge carriers by recombination. As an alternative to gold doping, charge carrier recombination within the ribs 108, 312, 408, 512 may be increased by forming lattice defects therein which function as recombination sites. Such defects may be introduced by exposing the ribs 108, 312, 408, 512 to high power laser, electron or hydrogen ion beams. Alternatively, the ribs 108, 312, 408, 512 may be exposed to intense neutron beams for introducing the defects.

In FIGS. 2 to 6, dopant types may be swapped, namely n+ doped and p+ doped regions become p+ doped regions and n+ regions respectively, to provide alternative optical devices of the invention. This does not affect their mode of operation other than reversing polarity of applied potential required for injecting charge carriers into the rib 108, 312, 408, 512. Although thermal bonding of wafers at a temperature of 1100° C. is described above, satisfactory bonding may be achieved in a range of temperatures from 800° C. to 1200° C. Although provision of the atmosphere of wet oxygen and nitrogen described above may improve bonding strength, it is not essential for achieving a thermal bond between wafers. The bond is sufficiently robust to survive further high temperature processing steps, for example steps necessary for integrating electronic circuits onto the wafers. Other methods of bonding may also be used to fabricate the device instead of employing thermal bonding, for example fusion bonding.

Electronic circuits may be monolithically integrated with the devices 100, 200, 300, 400, 500. These circuits may comprise, for example, buffer amplifiers and logic gates. The circuits may be fabricated after formation of the rib 108, 312, 408, 512, 624, 724, 880, 980. Alternatively, the circuits may be formed prior to formation of the rib 108, 312, 408, 512, 624, 724, 880, 980 and may be protected from etching in a similar manner to which the rib itself is protected during etching, for example by a resist layer or a metallic masking layer which is later removed by processes such as sputtering, plasma etching or wet chemical etching.

Although the rib 108, 312, 408, 512, 624, 724, 880, 980 incorporates dopant impurity to a concentration of less than $10^{16}$ atoms $cm^{-3}$, the concentration may be increased above $10^{18}$ atoms $cm^{-3}$ with a consequence that radiation absorption within the device 100, 200, 300, 400, 500 increases correspondingly.

Although the optical devices 100, 200, 300, 400, 500 shown in FIGS. 2 to 6 are based on silicon semiconductor technology, they may alternatively be fabricating using wafer bonding techniques in III–V semiconductor materials.

Although fabrication of single optical devices is illustrated in FIGS. 7 to 10, it is possible to fabricate a number of devices simultaneously on the wafers 600, 604, 700, 702, 850, 856, 950, 952. The devices thereby fabricated may be separated from one another by dicing or sawing the couplets 626, 726, 886, 986, said devices then comprising elements of the wafers 600, 604, 700, 702, 850, 856, 950, 952 which are bonded together. Alternatively an array of the devices 100, 200, 300, 400, 500 may be fabricated on a wafer couplet for providing a phased array device.

Although the devices 100, 200, 300, 400, 500 are adapted to modulate radiation, use of high conductivity buried layers, for example metal silicide layers, in other types of semiconductor optical devices, for example high power solid state lasers, is also feasible for providing an electrical path of reduced series resistance for applying bias to said devices.

What is claimed is:

1. An optical device having an active region (108; 312; 408; 512) for radiation propagation and injecting means (110; 202, 204; 410, 414; 514, 520) for injecting charge carriers into the active region, characterised in that the injecting means incorporates a high conductivity buried layer (104; 202; 306, 308; 402; 506) between two wafer elements of a bonded wafer couplet and the device incorporates concentrating means (204; 414) between the buried layer and the active region for concentration of charge carriers in the active region.

2. A device according to claim 1, characterised in that the concentrating means (414) is a region of the buried layer (402) which projects through an insulating layer (404) extending between parts of the device.

3. A device according to claim 2, characterised in that the buried layer is a polysilicon layer (402).

4. A device according to claim 3, characterised in that the polysilicon layer (402) incorporates dopant impurity to a concentration in a range of $10^{18}$ to $10^{19}$ atoms cm$^{-3}$.

5. A device according to claim 1, characterised in that the concentrating means is a heavily doped region (204) of different chemical composition to the buried layer (202).

6. A device according to claim 5, characterised in that the heavily doped region (204) and the buried layer (202) share a like dopant impurity providing conductivity in the former.

7. A device according to claim 6, characterised in that the dopant impurity is thermally diffusable from the buried layer (202) to the heavily doped region (204).

8. A device according to claim 6 or 7, characterised in that the dopant impurity concentration in the heavily doped region is in a range of $10^{18}$ to $10^{19}$ atoms cm$^{-3}$.

9. A device according to claim 1, characterised in that the buried layer is a metal silicide layer (202).

10. A device according to claim 9, characterised in that the buried layer (202) is a tungsten silicide layer.

11. A device according to claim 9, characterised in that the buried layer (202) is any one of tantalum silicide layer, a cobalt silicide layer and a titanium silicide layer.

12. A device according to claim 1, characterised in that the buried layer (708) incorporates a chemical element of the wafer couplet (714) material.

13. A device according to claim 12, characterised in that the buried layer (202; 708) is a metal silicide and the wafer couplet material is silicon.

14. A device according to claim 1, characterised in that it incorporates a dielectric insulating layer (304; 504) for electrically isolating the active region, the buried layer, the injecting means and the concentrating means from other elements of the device.

15. A device according to claim 1, characterised in that the active region incorporates dopant impurity to a concentration to a concentration of less than $10^{16}$ atoms cm$^{-3}$.

16. An optical device according to claim 1, characterised in that the active region (108; 312; 407, 512) provides radiation waveguiding means with refractive index modulatable by the injecting means.

17. A device according to claim 1, characterised in that one of the wafer elements in the couplet provides the active region.

18. A device according to claim 1, characterised in that the concentrating means comprises a first electrode (110) located upon one side of the active region and the device includes a second electrode (204) located upon the other side.

19. A device according to claim 18, characterised in that the first electrode lies between the active region (108) and an insulating layer (102).

20. A device according to claim 1, characterised in that the active region provides radiation waveguiding means and the injecting means is arranged to modulate the refractive index of the waveguiding means by injecting charge carriers predominantly into regions thereof in which radiation predominantly propagates.

21. A device according to claim 1, characterised in that the buried layer (202) has a coefficient of resistivity of less than 1.5 $\mu\Omega$m.

22. A device according to claim 1, characterised in that the buried layer (202) has a coefficient of resistivity of less than 7.5 $\Omega$ per square.

23. A device according to claim 1, characterised in that the buried layer incorporates at least one of holes, island and channels for relieving stress between it and a layer bonded to it.

24. A device according to claim 1, characterised in that the active region incorporates at least one of:

(i) gold doping; and (ii) induced lattice defects, for reducing carrier lifetime and increasing recombination site density therein.

25. A method of fabricating an optical device including the steps of:

(a) providing first and second wafer elements (700, 702; 850, 856);

(b) providing the wafer elements with a layer structured (706, 708, 710; 854, 862, 858) to define injecting means for injecting charge carriers into an active device region for radiation propagation;

(c) providing one of the wafer elements with a metal silicide (708) or a polysilicon layer (862) to provide injecting means;

(d) bonding the wafer elements to form a wafer couplet (714; 866) within which the metal silicide layer or the polysilicon layer is buried; and (e) processing the couplet (714; 866) to define the active device region.

26. A method according to claim 25 characterised in that, in step (b), the structured layer is an insulating layer (858) which is formed with a void (860) and, in step (c), the injecting means is formed to extend through the void (860).

27. A method according to claim 25, characterised in that the suicide layer comprises a tungsten silicide layer.

28. A method according to claim 25 wherein, in step (d), the wafer elements are thermally bonding by bringing them into contact with one another for a period and heating them to a temperature in a range of 800° C. to 1200° C. during the period.

29. A method according to claim 25, characterised in that the silicide layer (708) is selectively doped with dopant impurities which diffuse therefrom to an adjoining layer (706), thereby defining a conducting region (320b; 703) for concentrating charge carrier injection into the device active region (324; 724).

30. A method according to claim 25, characterised in that the device active region is at least one of gold doped or irradiated for increasing charge carrier recombination site density therein.

31. A method according to claim 25, characterised in that at least one of holes, island and channels are formed into the metal silicide layer for relieving stress between it and a layer bonded to it.

* * * * *